(12) United States Patent
Montie et al.

(10) Patent No.: US 7,838,169 B2
(45) Date of Patent: Nov. 23, 2010

(54) FUEL CELL CATHODE FLOW FIELD

(75) Inventors: Greg Montie, Chilliwack (CA); Rodney Bruce Redlich, Abbotsford (CA); David Earl Leger, Chilliwack (CA)

(73) Assignee: Power Disc Development Corporation Ltd., Chilliwack, B.C. (CA)

( * ) Notice: Subject to any disclaimer, the term of this patent is extended or adjusted under 35 U.S.C. 154(b) by 376 days.

(21) Appl. No.: 11/794,876

(22) PCT Filed: Dec. 29, 2005

(86) PCT No.: PCT/CA2005/001984

§ 371 (c)(1),
(2), (4) Date: Nov. 26, 2007

(87) PCT Pub. No.: WO2006/072165

PCT Pub. Date: Jul. 13, 2006

(65) Prior Publication Data

US 2008/0213648 A1    Sep. 4, 2008

Related U.S. Application Data

(60) Provisional application No. 60/641,141, filed on Jan. 5, 2005.

(51) Int. Cl.
   *H01M 8/04* (2006.01)
(52) U.S. Cl. ...................................... 429/514
(58) Field of Classification Search .................... 429/34
   See application file for complete search history.

(56) References Cited

U.S. PATENT DOCUMENTS 6,048,633 A    4/2000    Fuji et al.
6,551,736 B1    4/2003    Gurau et al.
6,686,082 B2    2/2004    Leger et al.
2003/0108782 A1*    6/2003    Leger et al. ................... 429/30
2004/0067405 A1    4/2004    Turpine et al.
2004/0197633 A1    10/2004    Yamamoto et al.
2005/0271909 A1*    12/2005    Bai et al. ...................... 429/13
2006/0234107 A1*    10/2006    Leger et al. ................... 429/38

FOREIGN PATENT DOCUMENTS

CA    2380637 A1 *    7/2002
JP    06267564    9/1994
WO    WO 03/094269    11/2003

OTHER PUBLICATIONS

International Search Report and Written Opinion of the International Searching Authority for corresponding PCT Application No. PCT/CA2005/001984.

* cited by examiner

*Primary Examiner*—Patrick Ryan
*Assistant Examiner*—Muhammad Siddiquee
(74) *Attorney, Agent, or Firm*—Gordon Thomson (57) ABSTRACT

A fuel cell cathode flow field has multiple channels each with a cross-sectional area that varies along the length of the channel such that oxygen availability at every lengthwise position along the channel is kept substantially constant for a given channel length and air stoichiometry ratio. Each channel comprises a flat floor with substantially constant depth and a pair of side walls extending upwardly from the floor; the side walls each taper inwards from channel inlet to outlet with a convex curve relative to the channel centreline. Achieving substantially uniform oxygen availability throughout the flow field results in substantially uniform current density throughout the flow field, which is desirable for efficient fuel cell operation and improved performance.

15 Claims, 6 Drawing Sheets

FUEL CELL CATHODE FLOW FIELD

CROSS REFERENCE TO RELATED APPLICATIONS

This is the U.S. National Stage of International Application No. PCT/CA2005/001984, filed Dec. 29, 2005, which in turn claims the benefit of U.S. Provisional Patent Application No. 60/641,141, filed Jan. 5, 2005.

FIELD OF THE INVENTION

This invention relates generally to fuel cells and in particular to a method of manufacturing a cathode flow field for a fuel cell, and a fuel cell having same.

BACKGROUND OF THE INVENTION

In typical polymer electrolyte membrane (PEM) fuel cells, a membrane electrode assembly (MEA) is disposed between two electrically conductive separator plates. Oxidant and fuel flow fields provide means for directing the oxidant and fuel to respective electrocatalyst layers of the MEA, specifically, to an anode on the fuel side and to a cathode on the oxidant side of the MEA. A typical reactant fluid flow field has at least one fluid channel between an inlet and an outlet in which a fluid stream flows therethrough. The fluid flow field is typically integrated with the separator plate by locating a plurality of open-faced channels on the faces of the separator plate. The open-faced channels face an electrode surface, where the reactants are electrochemically reacted. In a single cell arrangement, separator plates are provided on each of the anode and cathode sides. The plates act as current collectors and provide structural support for the electrodes.

It is standard industry practice to flow oxidant air through the cathode fuel flow plate at a higher flow rate than theoretically required for the electrochemical reaction to take place. In other words, the air stoichiometry ratio in the fuel cell is greater than 1, and is typically in the range of about 2. The fuel cell is operated at such an air stoichiometry ratio to, inter alia, avoid localized or systemic oxygen starvation within the fuel cell. Oxygen starvation is a complicated phenomenon that occurs when the partial pressure of oxygen falls below a critical level at one or more locations within the cathode flow field. Effects of oxygen starvation can be observed as a rapid decrease in cell voltage which in severe cases can cause a hot spot on the surface of the membrane.

As air flows along the flow field from inlet to outlet, the oxygen content in the air stream tends to be depleted and the air pressure tends to drop, resulting in reduced performance in the fuel cell. Applicant's own application PCT CA 02/00816 discloses a cathode flow field having delineating flow channels that continuously taper in width from inlet to outlet. The taper is straight, and results in an increased flow rate and reduced pressure drop as the air flows from inlet to outlet. The increasing air flow rate at a given position in the flow channel compensates somewhat for the depletion of oxygen within the air at that position caused by the electrochemical reaction. Therefore, the oxygen availability at a given position in the tapered channel is greater than in a flow channel having a constant cross-sectional area.

While the straight-tapered channels of the PCT CA 02/00816 application do provide improved oxygen availability at the downstream end of the flow field, they do not achieve substantially constant oxygen availability throughout the flow field. It is theorized that maintaining constant oxygen availability throughout the flow field contributes to achieving even current density throughout the fuel cell active area.

SUMMARY OF THE INVENTION

One of the challenges of PEM fuel cell design is to achieve even current density throughout the active area of the fuel cell; even current density is desirable for achieving efficient fuel cell performance. It is a general object of the invention to provide a cathode flow field that provides improved fuel cell performance. A specific object of the invention is to provide a flow field that is able to maintain substantially constant oxygen availability throughout the fuel cell flow field under certain operating conditions.

According to one aspect of the invention, there is provided a fuel cell cathode flow channel comprising a cross-sectional area that varies along the length of the channel such that oxygen availability at every lengthwise position along the channel is kept substantially constant for a given channel length and air stoichiometry ratio. In particular, there is provided a fuel cell cathode flow channel comprising: an inlet; an outlet; a floor of substantially constant depth extending lengthwise between the inlet and outlet; and a pair of opposed side walls extending upwards from the floor that define a channel width therebetween that decreases exponentially along the length of the channel from the inlet to the outlet. The channel width at the selected lengthwise position can be proportional to the channel width at the channel inlet.

The channel width can decrease according to a natural exponential function. In such case, the channel width at a selected lengthwise position of the channel can be proportional to a natural exponential function of the selected lengthwise position. The natural exponential function can also be a function of a constant derived from an air stoichiometry ratio of a fuel cell in which the flow channel is incorporated. This constant can be a natural logarithm of a function of the air stoichiometry ratio.

According to another aspect of the invention, there is provided a fuel cell separator plate comprising at least one of the flow channels described above. Optionally, the separator plate comprises multiple such cathode flow channels, wherein the flow channels are laterally spaced from each other by separator ribs. The flow channels collectively define a flow field that can be arrayed in a generally trapezoidal geometry. The separator ribs can have a substantially constant width to enable such trapezoidal geometry. The separator plate can further comprise partial separator ribs located at the inlet of each flow channel.

DETAILED DESCRIPTION OF EMBODIMENTS OF THE INVENTION

According to one embodiment of the invention, a method of manufacturing a cathode flow field for a PEM fuel cell is provided which is based on designing a flow channel that maintains substantially constant oxygen availability for the fuel cell electrochemical reaction throughout the length of the channel, for a given channel length and air stoichiometry ratio.

We theorize that oxygen availability is proportionate to fuel cell performance, and that uniform oxygen availability promotes uniform current density, which is desirable for efficient fuel cell operation and improved performance.

Oxygen availability is a function of oxygen mass flow and velocity, and is defined as follows:

$$AVAIL_{O2}(x) = m(x)v(x) \quad (1a)$$

$$AVAIL_{O2}(x) = (1.7 \times 10^{-14}) \frac{\rho_{air}\left((I\ Stoich) = I_d \int_0^x W(x)dx\right)(I\ Stoich)}{A(x)} \ [kg \cdot m/s^2] \quad (1b)$$

wherein, $AVAIL_{O2}(x)$ Oxygen Availability at position x [kg·m/s²]

$\dot{m}_{O_2}(x)$ Mass flow rate of oxygen at position x [kg/s]

$v(x)$ Velocity of flow at position x [m/s]

$\rho_{air}$ Air density [kg/m³]

$I_d$ Current density (constant) [A/m²]

I Entire channel current load [A]

Stoich Air stoichiometry ratio $A(x)$ Area (of flow) in channel at position x [m]

Assumptions. To derive equation 1(b), the following assumptions were made:

1. Uniform current density; the objective is to manufacture a cathode flow channel that can achieve uniform current density;
2. Single phase state (gas farm): to reduce thermodynamic complexity, any liquid water produced by the reaction is considered to be the only fluid in liquid form; all other masses are considered to be in gas form;
3. Evenly distributed oxygen concentration, velocity, and mass flow across flow section; complex flow patterns are not considered in the interest of reducing mass flow complexity;
4. Reaction is considered to be local to the flow channel only: the model does not consider above-rib activity;
5. Steady state system: the reaction and flows are considered to be steady state, or unchanging.

O2 Availability Equation Derivation. Derivation of equation 1(b) from equation 1(a) is described as follows:

Definition of Variables Used in Derivation:

x Position along channel length [m]

$v(x)$ Velocity of flow at position x [m/s]

$AVAIL_{O2}(x)$ Oxygen Availability at position x [kg·m/s²]

$\dot{m}_{O_2}(x)$ Mass flow rate of oxygen at position x [kg/s]

$\dot{m}_{O_2\ consumed}(x)$ Mass flow rate of oxygen consumed up to position x [kg/s]

$\dot{V}(x)$ Volumetric flow rate [SLPM]

I Entire channel current load [A]

$I_{acc}(x)$ Accumulated current up to position x [A]

$I_d$ Current density (constant) [A/m²]

Stoich Air stoichiometry ratio $\rho_{air}$ Air density [kg/m³]

$A(x)$ Cross-sectional flow area at position x [m²]

$D(x)$ Depth of channel at position x [m]

$W(x)$ Width of channel at position x [m]

L Length of channel [m]

Oxygen availability is defined as the oxygen mass flow rate by velocity [kg m/s²]:

$$AVAIL_{O2}(x) = \dot{m}_{O_2}(x)v(x) \quad (1a)$$

In the cathode flow channel, the mass rate of oxygen is consumed as the air translates along the flow channel. The mass flow rate of oxygen at a given position x along the channel is:

O₂ mass flow at x=O₂ mass flow at beginning−O₂ mass flow consumed to x $$\dot{m}_{O_2}(x) = \dot{m}_{O_2}(0) - \dot{m}_{O_2\ Consumed}(x) \quad (2a)$$

Where $$\dot{m}_{O_2}(0) = (2.78 \times 10^{-7})(22\%)\rho_{air}I\ Stoich\ [kg/s]$$

Where $$\dot{m}_{O_2 Consumed}(x) = (2.78 \times 10^{-7})(22\%)\rho_{air}I_{cc}(x)\ [kg/s]$$

$$\dot{m}_{O_2}(x) = (6.1 \times 10^{-8})\rho_{air}((I\ Stoich) - I_{acc}(x))\ [kg/s]$$

These equations are based on a well known empirically derived fuel cell reaction fundamental principle, namely: volumetric air flow rate (in standard liters per minute [SLPM])=0.0167×air stoichiometry (Stoich)×current load (I). The value $2.78 \times 10^{-7}$ is obtained by converting 0.0167 SLPM air to m³/s.

The velocity of oxygen (also equivalent to air velocity) at a given position x along the channel is:

Velocity at x=Air volumetric rate at x/Flow area at x $$v(x) = \frac{\dot{V}_{AIR}}{A_{flow}} \quad (2b)$$

$$v(x) = \frac{(2.78 \times 10^{-7})I\ Stoich}{A(x)}\ [m/s]$$

Combining equations 2(a) and (b) then gives:

$$AVAIL_{O2}(x) = (1.7 \times 10^{14})\frac{\rho_{air}((I\ Stoich) - I_{acc}(x))(I\ Stoich)}{A(x)} \ [kg \cdot m/s^2] \quad (1b)$$

where $I_{acc}(x) = I_d \int_0^x W(x)dx\ [A]$ $$AVAIL_{O2}(x) = (1.7 \times 10^{-14}) \frac{\rho_{air}\left((I\ Stoich) - I_d \int_0^x W(x)dx\right)(I\ Stoich)}{A(x)} \ [kg \cdot m/s^2]$$

Equation 1 (b) shows that uniformly increasing the quantity of oxygen availability (increasing oxygenation performance) can be achieved by:

Increasing current density ($I_d$)
increasing oxidant stoichiometry ratio
Increasing channel length (L)
Increasing average channel width ($\overline{W}$)
Increasing air density ($\rho_{air}$)
Decreasing channel depth (D)

As previously discussed, it is desirable to manufacture a fuel cell having uniform current density. Assuming that uniform current density can be achieved by maintaining uniform oxygen availability throughout the length (x) of the cathode flow channel, equation 1(b) shows that holding oxygen availability constant along x requires changes in flow area. The flow area A(x) for each position along the channel length can be determined by solving equation 1(b) for A(x) as shown in equation 7 below. For a rectangular flow area profile (i.e straight floor and side walls), the channel width and depth can be determined at any given lengthwise position x in the channel by defining area A(x) as the product of width W(x) and depth D(x), then changing the channel width or depth (W or D) along channel length x:

$$AVAIL_{O2}(x) = \quad (3)$$

$$(1.7 \times 10^{-14}) \frac{\rho\left((I\ Stoich) - I_d \int_0^x W(x) dx\right)(I\ Stoich)}{D(x)W(x)} \quad [kg \cdot m/s^2]$$

Cathode Flow Channel Having Varied Depth Profile

A cathode flow channel can be manufactured with a constant width and a varying depth profile to achieve constant oxygen availability throughout the stack. Such a channel profile is calculated as follows:

Using the oxygen availability equation as previously derived in equation 3:

$$AVAIL_{O2}(x) = \quad (3)$$

$$(1.7 \times 10^{-14}) \frac{\rho\left((I\ Stoich) - I_d \int_0^x W(x) dx\right)(I\ Stoich)}{D(x)W(x)} \quad [kg \cdot m/s^2]$$

and solving for channel depth D(x):

$$D(x) = (1.7 \times 10^{-14}) \frac{\rho\left((I\ Stoich) - I_d \int_0^x W(x) dx\right)(I\ Stoich)}{AVAIL_{O2}(x)W(x)}$$

Assuming constant oxygen availability $Avail_{O2}$ and width W, the following equation 4 is obtained:

$$\text{where } \int_0^x W(x) dx = Wx \quad (4)$$

$$\text{where } I = I_d WL$$

$$D(x) = (1.7 \times 10^{-14}) \frac{\rho((I_d WL\ Stoich) - (I_d Wx))(I_d WL\ Stoich)}{AVAIL_{O2} W}$$

-continued $$D(x) = \frac{(1.7 \times 10^{-14})\rho\ Stoich\ LI_d^2 W}{AVAIL_{O2}}(L\ Stoich - x) \quad [m]$$

The result is the depth profile is linear to x.

For the varied depth approach, to increase the total uniform $O_2$ availability (increasing oxygenation performance) requires, ordered in effectiveness, an:
increase in current density ($I_d$);
increase in stoichiometry;
increase in channel length (L);
increase in channel width (W);
increase in air density ($\rho$); or,
decrease in average depth ($\overline{D}$)

Cathode Flow Channel Having Varied Width Profile

Given the desire to minimize the thickness of the separator plates, it is desirable to keep the depth of the channel shallow. Therefore, instead of varying the depth of the channel, which would require a sufficiently thick plate to accommodate the deepest part of the channel, we propose to keep the channel depth constant and to vary the width of the channel only to achieve constant oxygen availability throughout the length of the channel.

Again, the $O_2$ availability equation is:

$$AVAIL_{O2}(x) = \quad (3)$$

$$(1.7 \times 10^{-14}) \frac{\rho\left((I\ Stoich) - I_d \int_0^x W(x) dx\right)(I\ Stoich)}{D(x)W(x)} \quad [kg \cdot m/s^2]$$

Applying constant oxygen availability $Avail_{O2}$ and channel depth D:

$$\text{where } I = I_d \int_0^L W(x) dx$$

$$AVAIL_{O2} = (1.7 \times 10^{-14})$$

$$\frac{\rho\left(Stoich\ I_d \int_0^L W(x) dx - I_d \int_0^x W(x) dx\right)\left(I_d \int_0^L W(x) dx\ Stoich\right)}{DW(x)}$$

Solving for W(x)

$$\frac{W(x)}{\left(Stoich\ I_d \int_0^L W(x) dx - I_d \int_0^x W(x) dx\right)\left(I_d \int_0^L W(x) dx\ Stoich\right)} =$$

$$\frac{\rho}{(1.7 \times 10^{-14}) AVAIL_{O2} D}$$

Equation (5) can be simplified to obtain:

$$W(x) = W(0) e^{-\frac{x}{L} \ln\left(\frac{STOICH}{STOICH-1}\right)} \quad (6)$$

Figure 1:
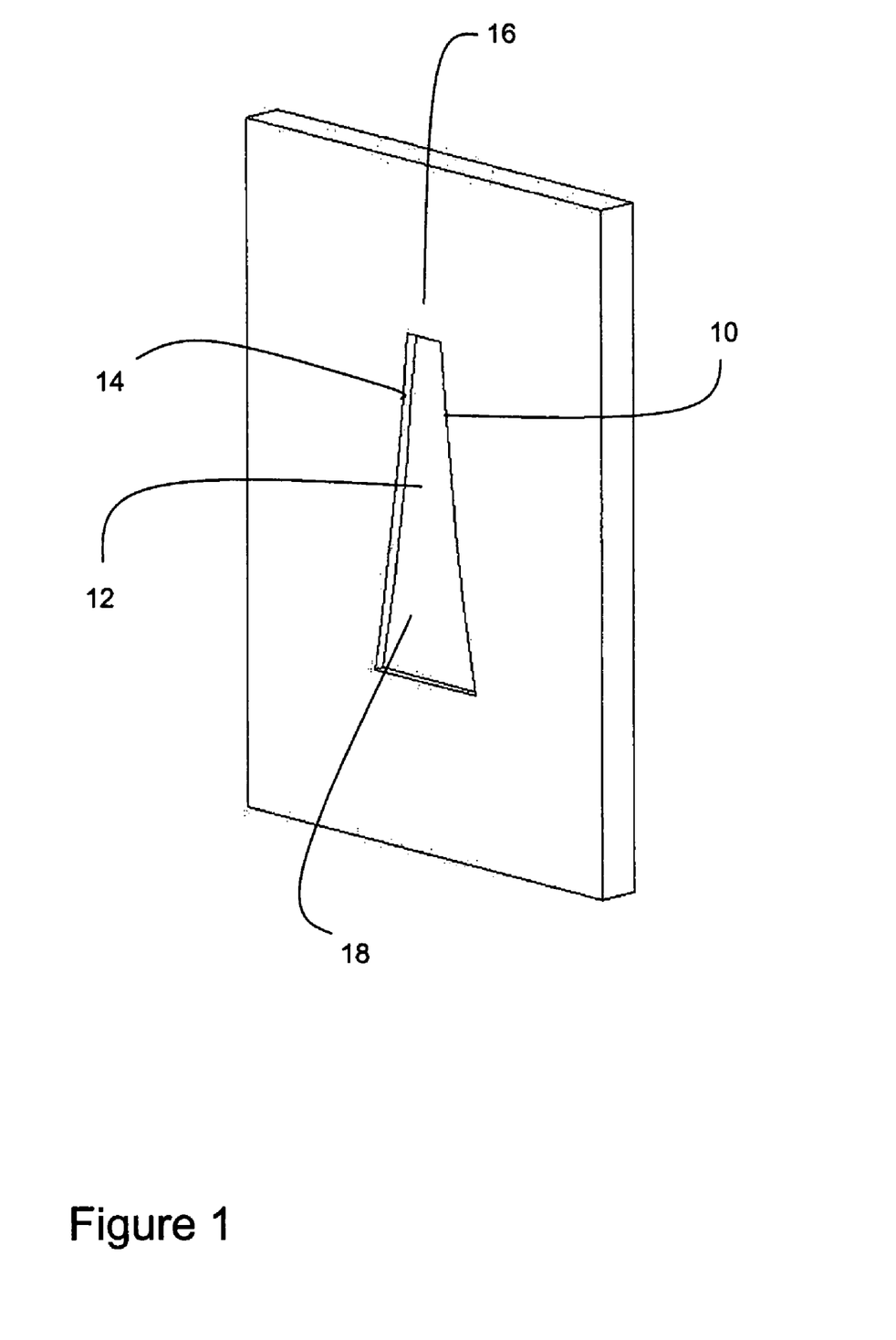
FIG. 1 is a schematic perspective view of a cathode flow channel having a geometry that achieves substantially constant oxygen availability under certain operating conditions.

Referring to FIG. 1, a channel profile can be defined by solving for W(x) in equation 6 at each position (x) along the length of the channel, given a specified operating air stoichiometry STOICH and channel length L, and assuming a constant flat channel floor. The resulting cathode channel 10 has a constant depth floor 12 with convexly curved side walls 14 that taper inwards from inlet to outlet. The walls 14 flare inwards towards an outlet end 16 with an inlet 18 having the largest width and the channel profile delineating at a diminishing rate. That is, the channel width decreases exponentially along the length of the channel from the inlet to the outlet according to the equation 6.

Figure 2:
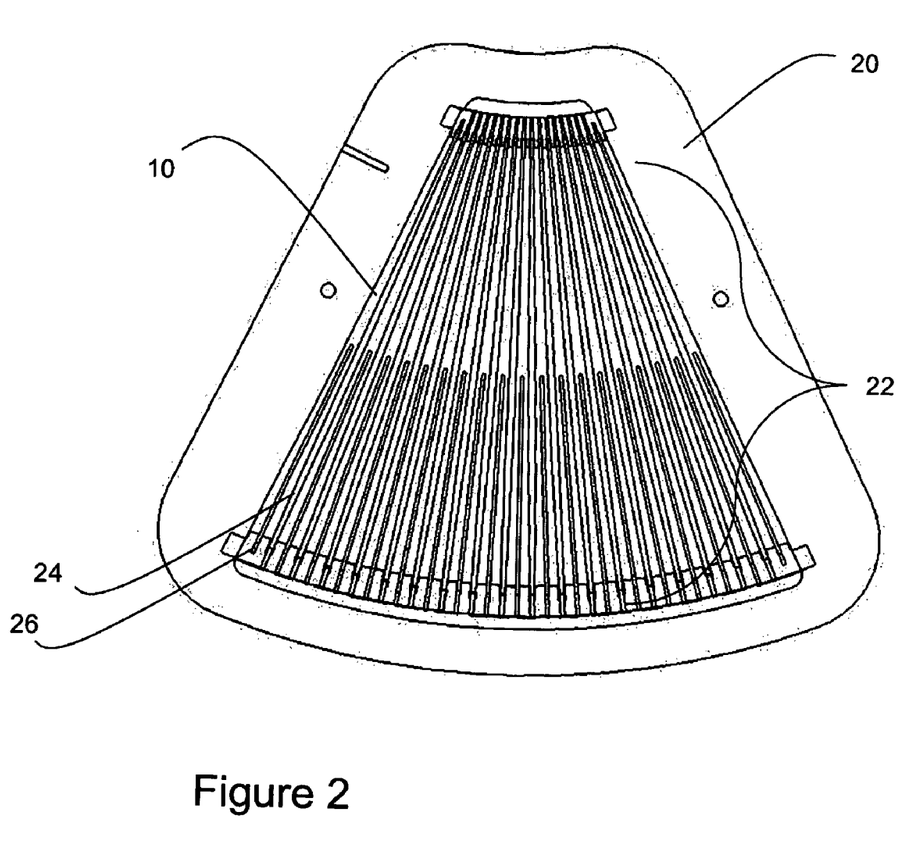
FIG. 2 is a schematic plan view of a cathode flow field on a separator plate having flow channels with the geometry shown in FIG. 1.
Figure 3:
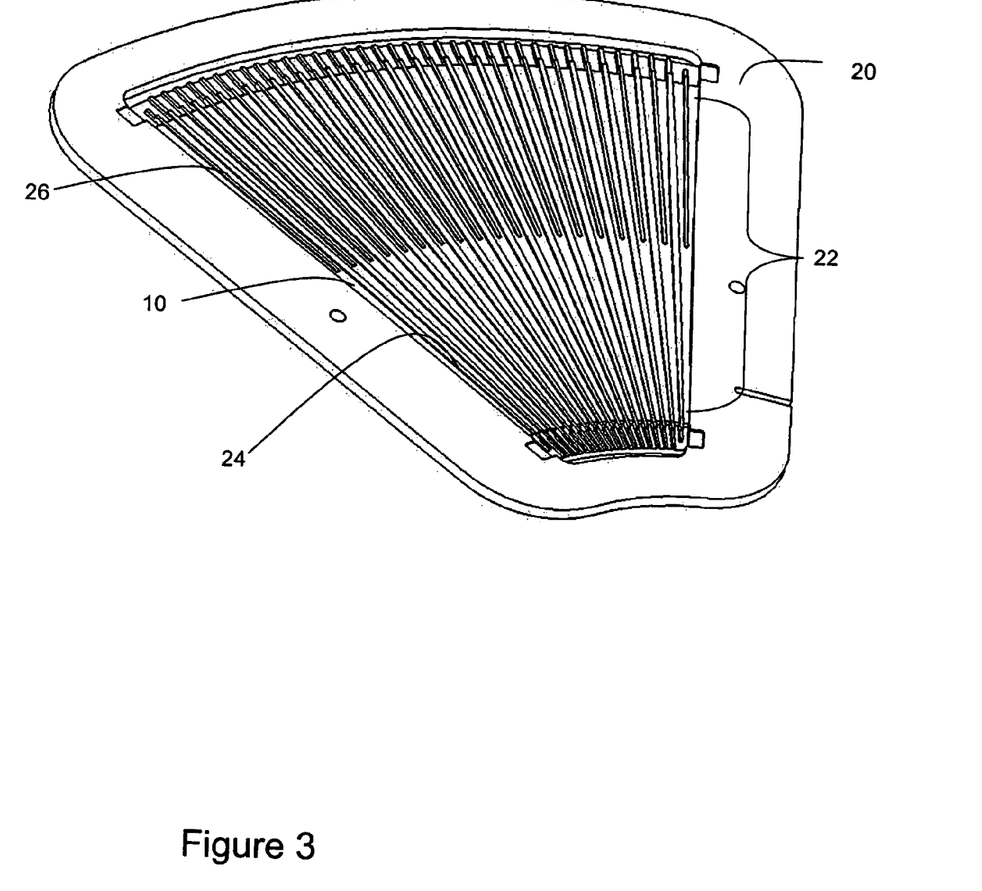
FIG. 3 is a schematic perspective view of the cathode flow field shown in FIG. 2.

Referring to FIG. 2, multiple channels 10 having the channel profile shown in FIG. 1 can be applied to a separator plate 20, to form a cathode flow field 22. The flow field 22 is arrayed in a generally trapezoidal geometry to enable separating ribs 24 to have a relatively even width from inlet 18 to outlet 16; it can be seen that using a conventional rectangular flow field geometry with tapering flow channels would require the ribs to also have a tapering profile. Such tapering rib profile would result in significant amounts of MEA contacting the ribs, resulting in reduced membrane active area and less efficient usage of membrane material. Since MEA material is relatively expensive, it is desirable to maximize the MEA active area using a generally even rib width. Using a generally trapezoidal flow field geometry also enables the flow field 22 to fit onto a trapezoidal separator plate 20, or to fit onto a traditional rectangular separator plate with room to spare on the separator plate for other components such as manifolding (not shown).

The separator plate 20 includes partial ribs 26 located at the inlet of each channel 10. The partial ribs 26 serve to reduce the distance between channel side walls 14, and serves as a bridging structure for the overlaid MEA (not shown).

Cathode Flow Channel Having Varied Cross-Sectional Area

If alternate techniques are used to generate a constant $O_2$ availability profile without a rectangular channel cross-section (flat floor, vertical walls), then a new variable $W_R(X)$ is introduced into equation 1(b). $W_R(X)$ is defined as the width of the oxygen reaction area at a given lengthwise position x in the channel (for a square channel cross-section, $W_R(X)=W(x)$ as the MEA/GDL exposed reaction width is the same as the channel width). A(x) is then calculated through iteration based on channel profile. This equation allows for various channel cross-sectional flow shapes that maintain a constant $O_2$ availability along the channel length. For example, alternative channel cross-flow profiles may include, but not limited to: U channel, polygonal channel, semi-circular channel, varying fillet channel corner, varying chamfer channel corner, varying side wall slope angle channel, or varying floor bevel.

$$A(x) = (1.7 \times 10^{-14}) \frac{\rho_{air}\left((I\ Stoich) - I_d \int_0^x W_R(x)dx\right)(I\ Stoich)}{AVAIL_{O2}(x)} \ [kg \cdot m/s^2] \quad (7)$$

EXAMPLES

A prototype of the cathode separator plate 20 was tested using a Hydrogenics FCATS Test Station with varying current density, and under the following conditions:

| | |
|---|---|
| Air stoichiometry: | 2.5 |
| Fuel stoichiometry: | 1.5 |
| Relative Humidity (RH): | 80-100% |
| Cell temperature: | 65° C. |
| External Backpressure: | None |

Figure 6:
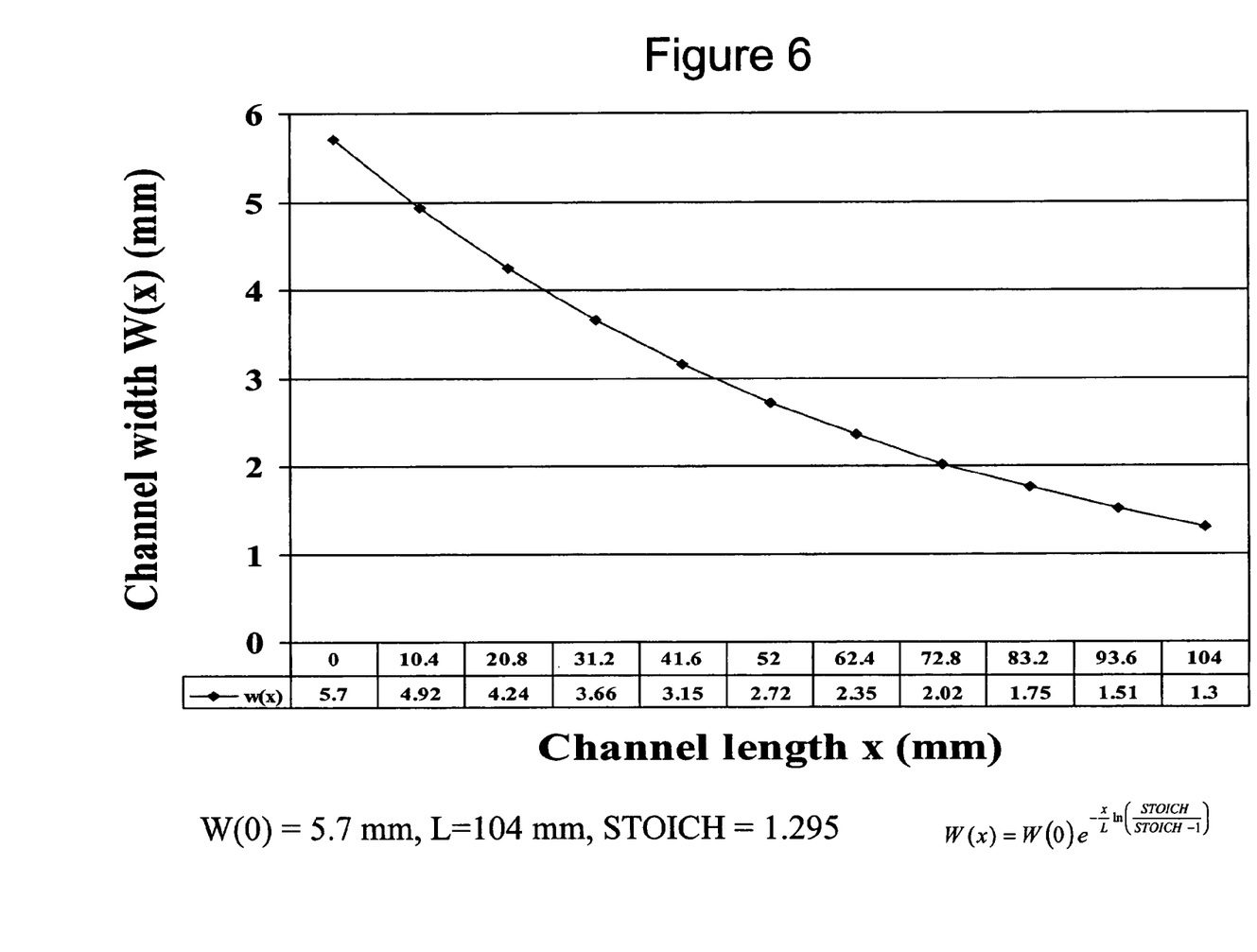
FIG. 6 is a graph illustrating a cathode flow channel side wall profile.

MEA:
Material: Gore PRIMEA Series 5510
Design: 25 um thick, 0.4 Pt/0.4 Pt C&A loading
GDL:
Material: SGL Carbon 30BC
Design: 0.32 mm thick, 77% porosity, cut to match MEA active area
Cathode Channel Profile:
Material: SGL Carbon BBP 4 Graphite
Design: Constant $O_2$ Availability Channels at 5.7 mm->1.3 mm wide for a 1.295 Air Stoich setting, 19 channels delineating, 0.3 mm channel depth, 1-0.6 mm (Inlet-Outlet) land widths, 0.75 mm×50 mm (W×L) inlet channel ribs, and 86 $cm^2$ active area
Anode Channel Profile:
Material: SGL Carbon BBP 4 Graphite
Design: 4 channels of dimensions 1 mm×1 mm×1052 mm (W×D×L), in a 13 pass serpentine arrangement, covering 86 $cm^2$ active area FIG. 6 illustrates a side wall profile for a cathode flow channel in the separator plate 20 based on equation 6.

Figure 4:
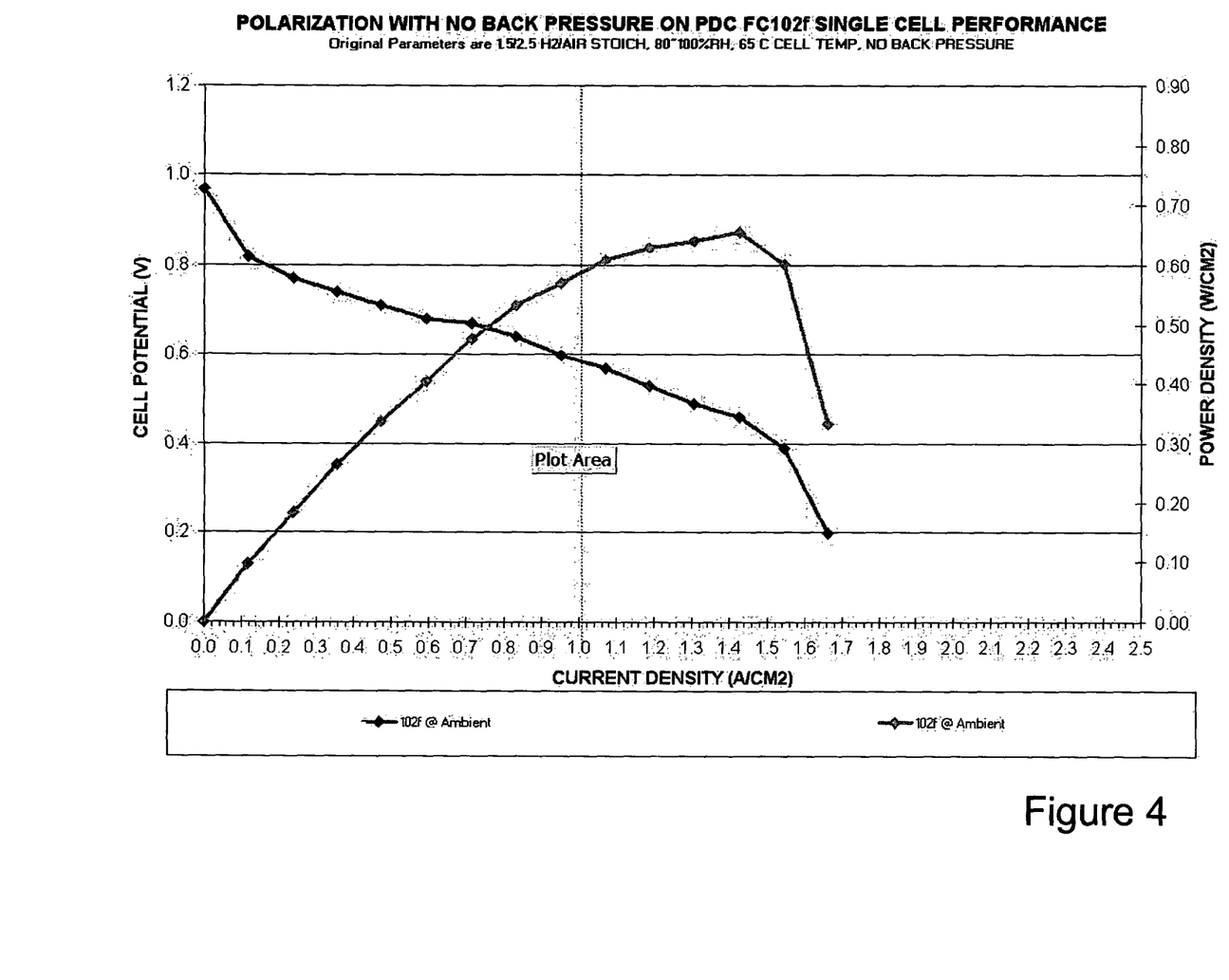
FIG. 4 is a graph illustrating cell performance as a function of current density for a fuel cell having the cathode flow field of FIGS. 2 and 3.

Referring to FIG. 4, testing results showed a fuel cell having the cathode separator plate 20 achieving an 11% improvement in peak electrical power over a fuel cell using a cathode flow field with straight tapering-width/constant depth channels based on a design disclosed in applicant's PCT application no. PCT CA 02/00816. It is also expected that a fuel cell having the cathode separator plate 20 will achieve performance benefits over a fuel cell having a separator plate with straight non-tapering flow channels of similar depth, length and average width.

A second test of the cathode separator plate 20 was performed with varying cathode stoichiometry and under the following conditions:

| | |
|---|---|
| Air stoichiometry: | varying |
| Fuel stoichiometry: | 1.5 |
| Current: | 30 and 86 A |
| Relative Humidity (RH): | 80-100% |
| Cell temperature: | 65° C. |
| Backpressure: | none |

Figure 5:
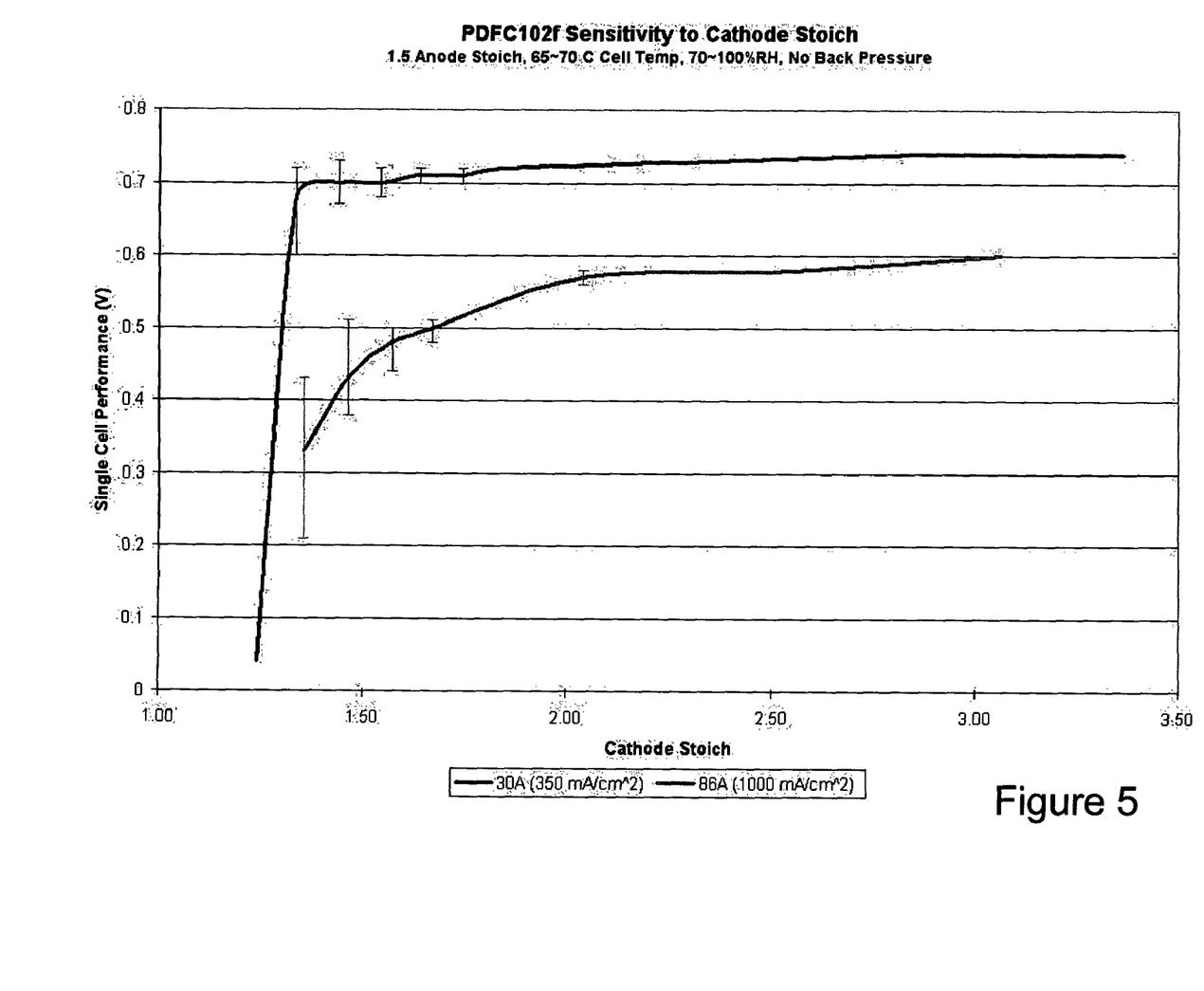
FIG. 5 is a graph illustrating cell performance as a function of cathode stoichiometry for a fuel cell having the cathode flow field of FIGS. 2 and 3.

MEA:
Material: Gore PRIMEA Series 5510
Design: 25 um thick, 0.4 Pt/0.4 Pt C&A loading
GDL:
Material: SGL Carbon 30BC
Design: 0.32 mm thick, 77% porosity, cut to match MEA active area
Cathode Channel Profile:
Material: SGL Carbon BBP 4 Graphite
Design: Constant $O_2$ Availability Channels at 5.7 mm->1.3 mm wide for a 1.295 Air Stoich setting, 19 channels delineating, 0.3 mm channel depth, 1-0.6 mm (Inlet-Outlet) land widths, 0.75 mm×50 mm (W×L) inlet channel ribs, and 86 $cm^2$ active area
Anode Channel Profile:
Material: SGL Carbon BBP 4 Graphite
Design: 4 channels of dimensions 1 mm×1 mm×1052 mm (W×D×L), in a 13 pass serpentine arrangement, covering 86 cm² active area Referring to FIG. 5, testing of a fuel cell having the separator plate 20 results showed an improved resilience to air stoichiometry (flow rate) when compared to both a cathode flow field having the straight tapering-width/constant depth channel design as in Applicant's PCT application PCT CA 02/00816 and a conventional flow field having straight non-tapering channels. The improved air stoich resilience indicates improved oxygen availability throughout the active area.

While the present invention has been described herein by the preferred embodiments, it will be understood to those skilled in the art that various changes may be made and added to the invention. The changes and alternatives are considered within the spirit and scope of the present invention. For example, it is expected that the cathode flow field would also be useful in direct methanol fuel cell (DMFC) applications.

What is claimed is:

1. A fuel cell cathode flow channel comprising:
   (a) an inlet;
   (b) an outlet;
   (c) a length and a floor of substantially constant depth having a substantially straight pathway between said inlet and said outlet; and
   (d) a pair of adjacent and opposed convexly curved side walls extending upwards from said floor and defining a channel width between said side walls that decreases exponentially along said length of the channel from the inlet to the outlet.

2. A fuel cell cathode flow channel as claimed in claim 1 wherein the channel width decreases according to a natural exponential function.

3. A fuel cell cathode flow channel as claimed in claim 2 wherein the channel width at a selected lengthwise position of the channel is proportional to a natural exponential function of the selected lengthwise position.

4. A fuel cell cathode flow channel as claimed in claim 3 wherein the natural exponential function is also a function of a constant derived from an air stoichiometry ratio of a fuel cell in which the flow channel is incorporated.

5. A fuel cell cathode flow channel as claimed in claim 4 wherein the constant is a natural logarithm of a function of the air stoichiometry ratio.

6. A fuel cell cathode flow channel as claimed in claim 4 wherein the channel width at the selected lengthwise position is also proportional to the channel width at the channel inlet.

7. A fuel cell cathode flow channel as claimed in claim 1 wherein the channel width at the selected lengthwise position is equal to:

$$W(0)e^{-\frac{x}{L}ln\left(\frac{STOICH}{STOICH-1}\right)}$$

wherein x is the selected lengthwise position, W(O) is the channel width at the inlet, L is the channel length, and STOICH is an air stoichiometry ratio of a fuel cell in which the flow channel is incorporated.

8. A fuel cell separator plate comprising at least one flow channel as claimed in claim 1.

9. A fuel cell cathode flow channel comprising a cross-sectional area that varies along a length of the channel such that oxygen availability at every lengthwise position along the channel is kept substantially constant for a selected air stoichiometry ratio and channel length, and further comprising:
   (a) an inlet;
   (b) an outlet;
   (c) a length and a floor of substantially constant depth having a substantially straight pathway between said inlet and said outlet; and
   (d) a pair of adjacent and opposed convexly curved side walls extending upwards from said floor and defining a channel width between said side walls that decreases exponentially along said length of the channel from the inlet to the outlet.

10. A fuel cell cathode flow channel as claimed in claim 9 wherein the channel width at a selected lengthwise position of the channel" is proportional to a base exponentiated to a power that is a function of the selected lengthwise position.

11. A fuel cell cathode flow channel as claimed in claim 10 wherein the base is a natural logarithmic base e.

12. A fuel cell cathode flow channel as claimed in claim 11 wherein the channel width at the selected lengthwise position is also proportional to the channel width at the channel inlet.

13. A fuel cell cathode flow channel as claimed in claim 12 wherein the power is also a function of an air stoichiometry ratio of a fuel cell in which the flow channel is incorporated.

14. A fuel cell cathode flow channel as claimed in claim 13 wherein the channel width at the selected lengthwise position is equal to:

$$W(0)e^{-\frac{x}{L}ln\left(\frac{STOICH}{STOICH-1}\right)}$$

wherein "x" is the selected lengthwise position, "W(O)" is the channel width at a channel start position, "L" is the channel length, and "STOICH" is an air stoichiometry ratio of a fuel cell in which the flow channel is incorporated.

15. A fuel cell cathode flow channel comprising a cross-sectional area that varies along a length of the channel such that oxygen availability at every lengthwise position along the channel is kept substantially constant for a selected air stoichiometry ratio and channel length wherein the channel area "A(x)" at the selected lengthwise position is equal to:

$A(x)=(1.7.\text{times}.10-14).\text{rho.air}\,((I\,\text{Stoich})-I\,d\,.\text{intg.}$
$0 \times WR(x)x)(I\,\text{Stoich})/\text{AVAIL}\,O2(x)[\text{kg m/s 2}]$ wherein "x" is the selected lengthwise position, "I" is an entire channel current load, "stoich" is an air stoichiometry ratio of a fuel cell in which the flow channel is incorporated, "Id" is current density, WR(X) is a width of the oxygen reaction area at the selected lengthwise position "x", and "AVAILO2(x)" is oxygen availability at the selected lengthwise position "x".

* * * * *